(12) United States Patent
Smith et al.

(10) Patent No.: US 7,345,632 B2
(45) Date of Patent: Mar. 18, 2008

(54) MULTIBEAM PLANAR ANTENNA STRUCTURE AND METHOD OF FABRICATION

(75) Inventors: Martin Smith, Chelmsford (GB); Andrew Urquhart, Bishops Stortford (GB); Ian Abraham, Bishops Stortford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 207 days.

(21) Appl. No.: 10/683,301

(22) Filed: Oct. 10, 2003

(65) Prior Publication Data

US 2004/0155819 A1    Aug. 12, 2004

Related U.S. Application Data

(60) Provisional application No. 60/447,527, filed on Feb. 14, 2003, provisional application No. 60/446,617, filed on Feb. 12, 2003, provisional application No. 60/446,618, filed on Feb. 12, 2003, provisional application No. 60/446,619, filed on Feb. 12, 2003, provisional application No. 60/447,643, filed on Feb. 14, 2003, provisional application No. 60/447,644, filed on Feb. 14, 2003, provisional application No. 60/447,645, filed on Feb. 14, 2003, provisional application No. 60/447,646, filed on Feb. 14, 2003, provisional application No. 60/451,897, filed on Mar. 4, 2003, provisional application No. 60/453,011, filed on Mar. 7, 2003, provisional application No. 60/453,840, filed on Mar. 11, 2003, provisional application No. 60/454,715, filed on Mar. 15, 2003, provisional application No. 60/461,344, filed on Apr. 9, 2003, provisional application No. 60/461,579, filed on Apr. 9, 2003, provisional application No. 60/464,844, filed on Apr. 23, 2003, provisional application No. 60/467,432, filed on May 2, 2003, provisional application No. 60/468,456, filed on May 7, 2003, provisional application No. 60/480,599, filed on Jun. 20, 2003.

(51) Int. Cl.
*H01Q 1/38* (2006.01)
*H01Q 21/20* (2006.01)

(52) U.S. Cl. .............................. 343/700 MS; 343/853; 342/374

(58) Field of Classification Search ......... 343/700 MS, 343/846, 853, 872, 799, 800; 342/374
See application file for complete search history.

(56) References Cited

U.S. PATENT DOCUMENTS

| | | | |
|---|---|---|---|
| 4,816,836 A * | 3/1989 | Lalezari | ............... 343/700 MS |
| 4,937,585 A * | 6/1990 | Shoemaker | .......... 343/700 MS |
| 5,510,803 A | 4/1996 | Ishizaka et al. | |
| 5,829,121 A | 11/1998 | Shoemaker | |
| 6,031,491 A | 2/2000 | Daniel et al. | |
| 6,144,344 A | 11/2000 | Kim et al. | |
| 6,462,711 B1 | 10/2002 | Zaghloul et al. | |
| 6,489,924 B2 | 12/2002 | Pretorius | |
| 6,864,853 B2 * | 3/2005 | Judd et al. | .................. 343/844 |
| 2002/0004125 A1 | 1/2002 | Ostrovsky | |
| 2004/0150561 A1 | 8/2004 | Tillery | |

FOREIGN PATENT DOCUMENTS

| | | |
|---|---|---|
| DE | 42 39 597 A1 | 6/1993 |
| EP | 0 253 128 A1 | 1/1988 |
| EP | 0468413 | 7/1991 |
| EP | 0 492 010 A1 | 7/1992 |
| EP | 0 975 047 A2 | 1/2000 |
| GB | 2 248 344 A | 4/1992 |
| WO | WO 98/29920 | 7/1998 |
| WO | WO 02/50953 | 6/2002 |
| WO | WO 02/060009 | 8/2002 |

OTHER PUBLICATIONS

Gao S C et al. "Low Cost, Dual Linearly Polarised Microstrip Patch Array" IEE Proceedings H. Microwaves, Antennas and Propagation, Institute of Electrical Engineers, Stevenage, GB—vol. 148, No. 1 Feb. 9, 2001—pp. 21-24.

* cited by examiner

*Primary Examiner*—Michael C. Wimer
(74) *Attorney, Agent, or Firm*—Barnes & Thornburg LLP; William M. Lee, Jr.

(57) ABSTRACT

The invention provides a multiple beam antenna and a method of fabricating such an antenna. The multiple beam antenna comprises: a flexible substrate having a conductive layer; a plurality of directional antennas; and a plurality of electrical connections being routed from each of the plurality of directional antennas to at least one area of the substrate. The plurality of directional antennas and the plurality of electrical connections are formed in the conductive layer, and the flexible substrate is shaped so that the plurality of directional antennas point in prescribed directions. This provides a low cost, high functionality multiple beam antenna. The multiple beam antenna can be shaped such that the directional antennas cover a full 360° or alternatively cover any range of other angles, (e.g. 270° or 180°).

40 Claims, 18 Drawing Sheets

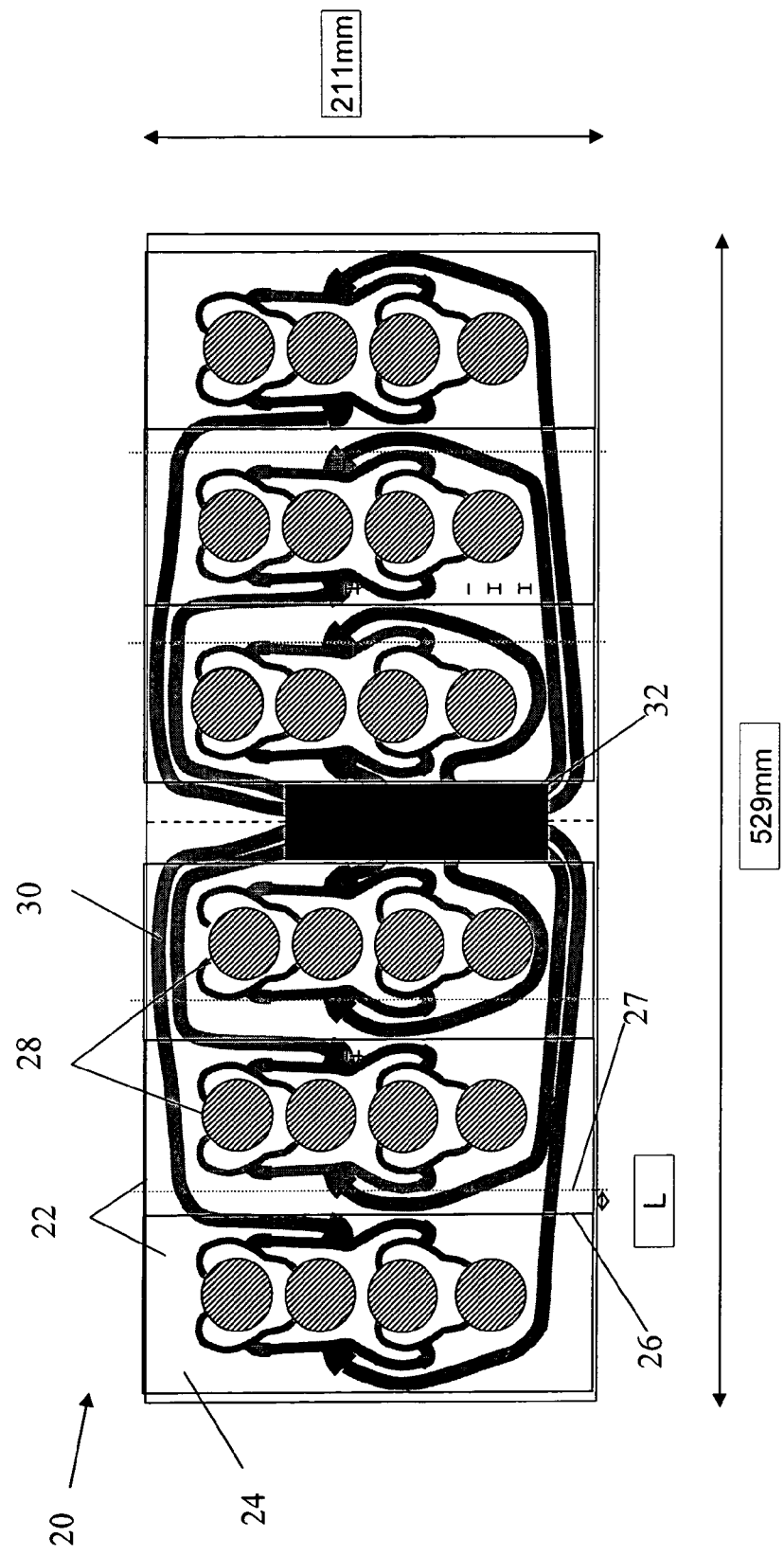

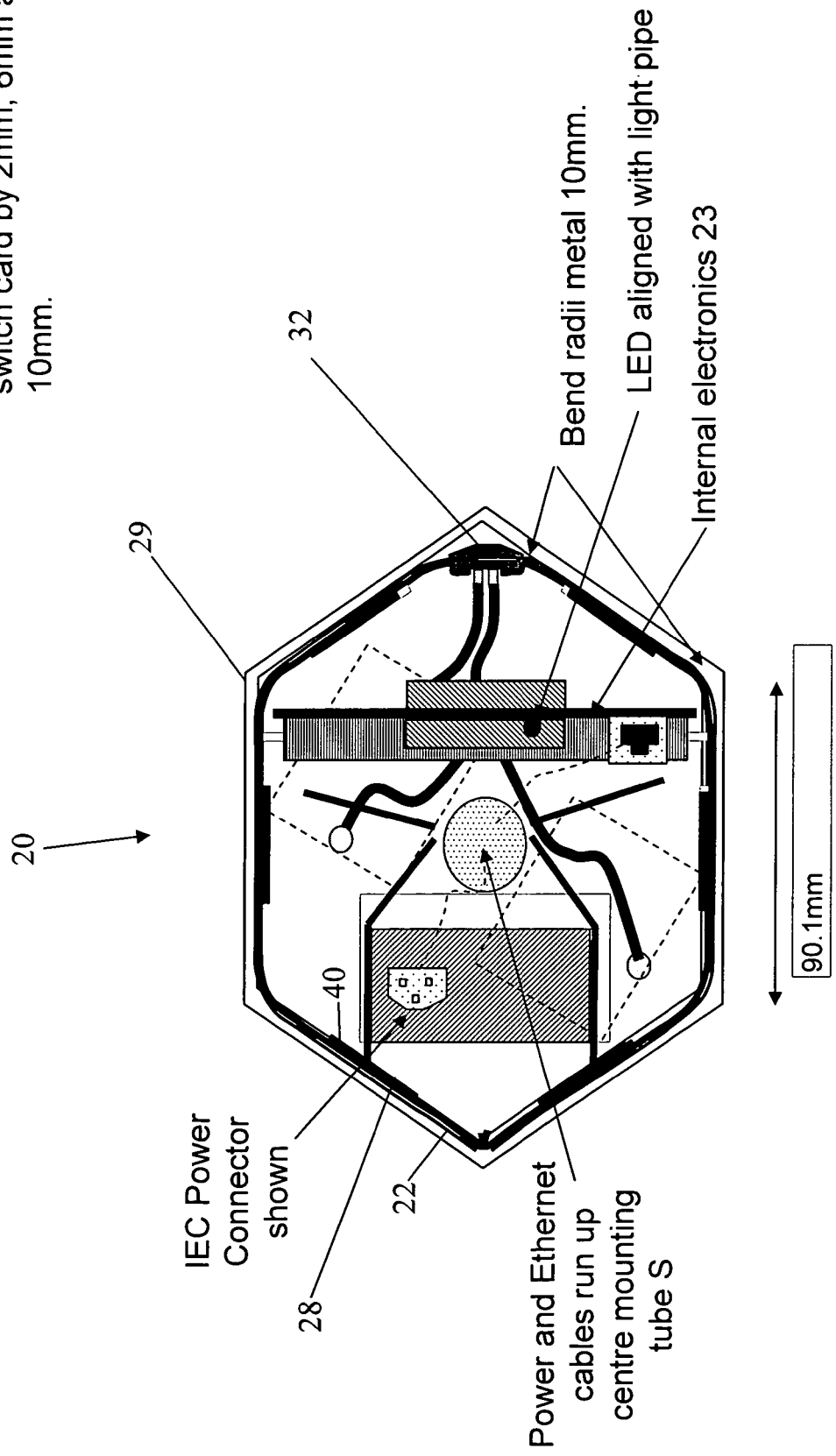

Transition Board Alignment and Fixing

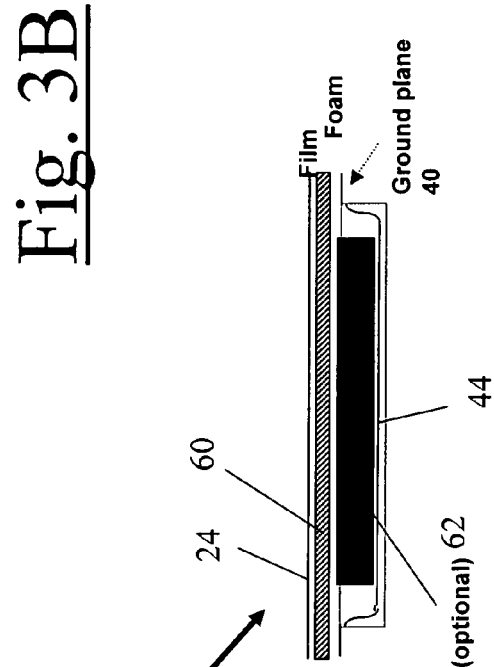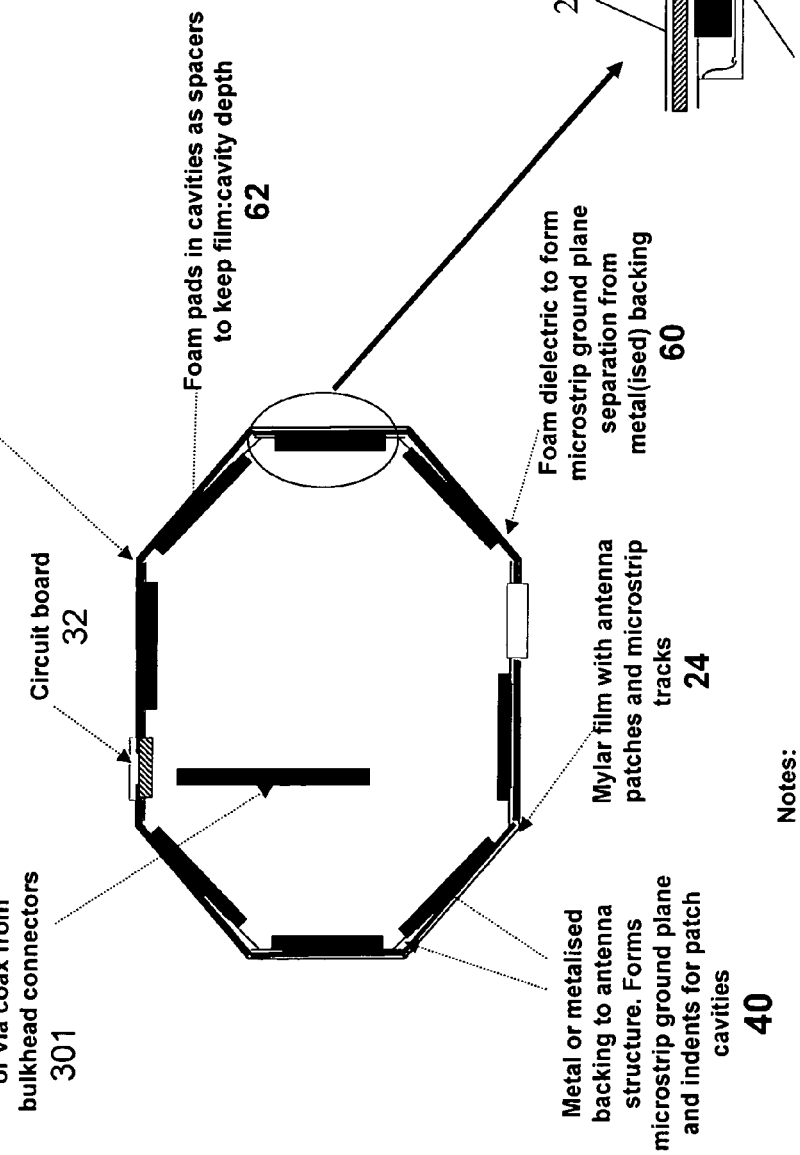

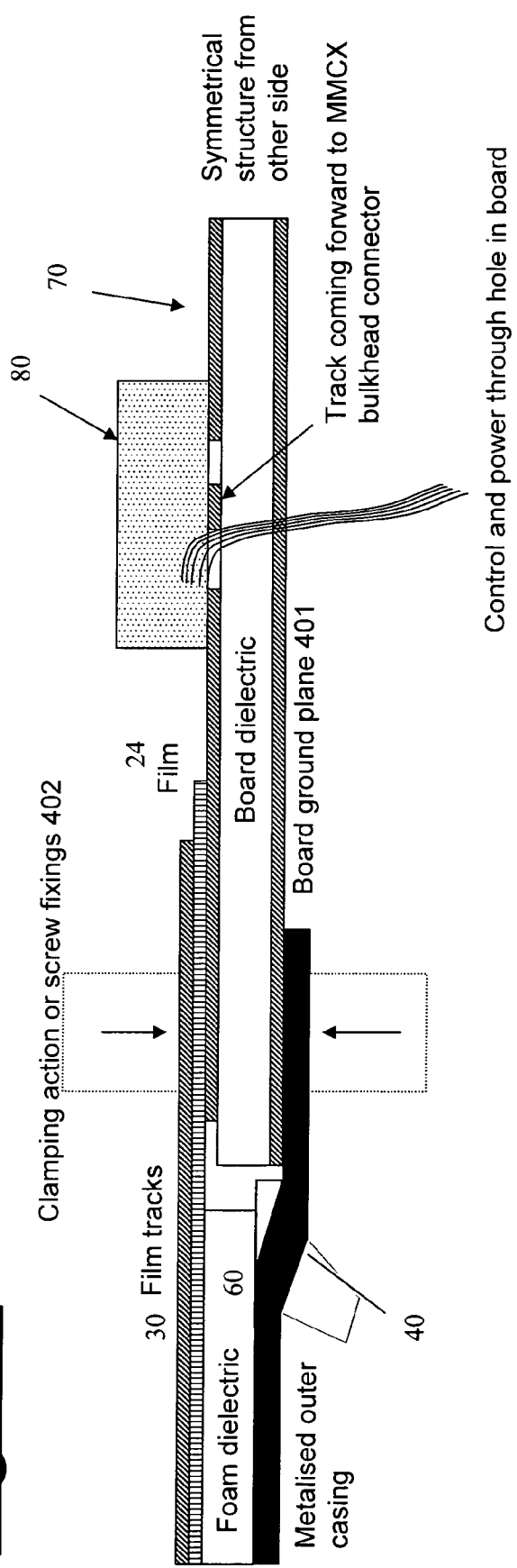

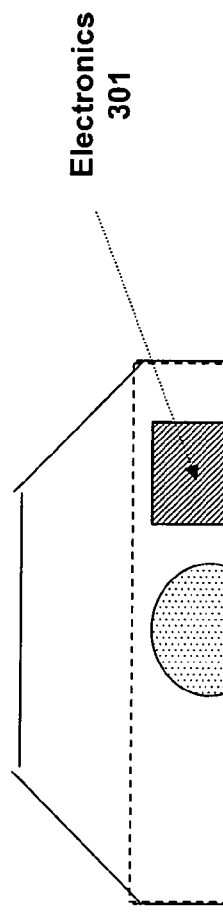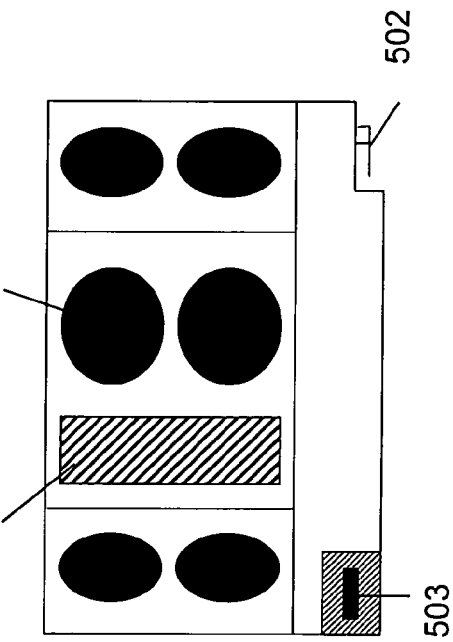
Fig. 5A
Fig. 5B

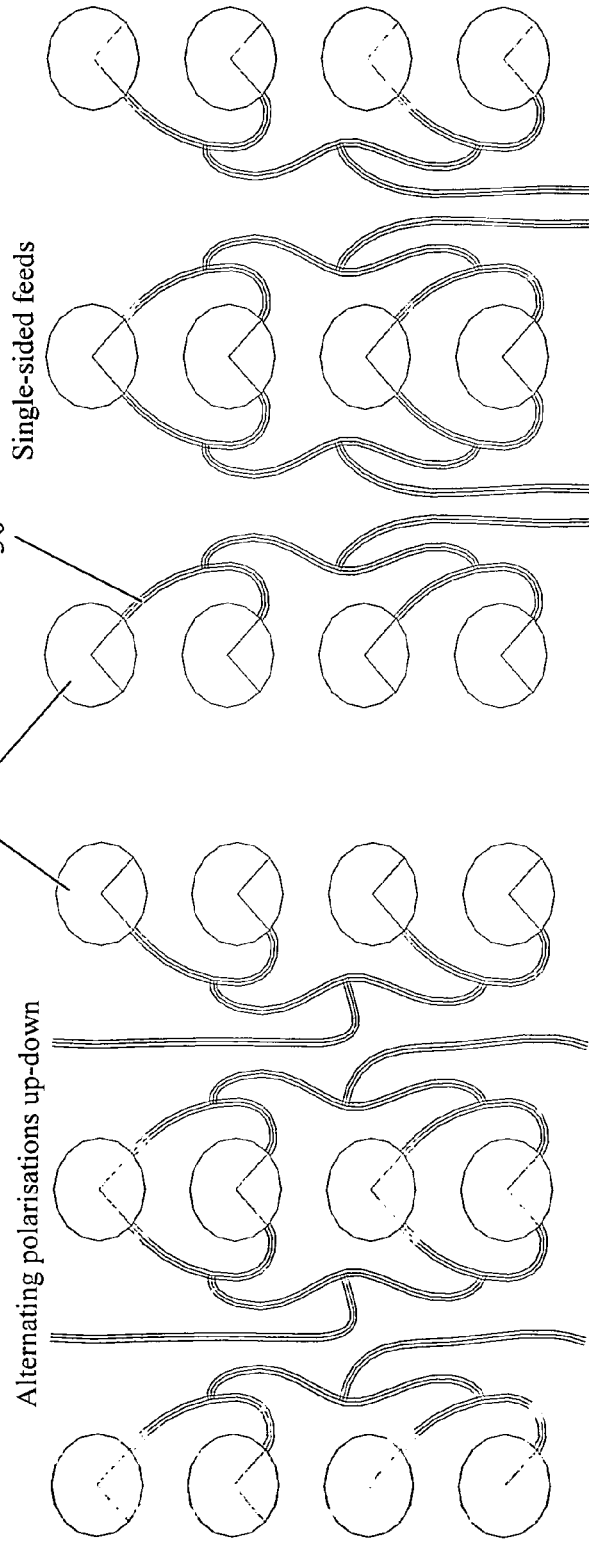

Extended facet – non-regular octagon

Minimum Height Option

Minimum facet height will be determined by circuit layout constraints. This arrangement requires 4 track plus 5 gap widths top and bottom ~28mm x 2.

This arrangement requires 9 track plus 10 gap widths on top only ~58mm – only 2mm more than minimum height arrangement

Fig. 10    Top and Bottom side connections

This arrangement requires 5 track plus 6 gap widths on top and 4 track plus 5 gaps at the bottom ~34mm + 28mm = 62mm. Only 6mm more than minimum height arrangement if switching board can fit in this space.

Wrap-around – connections at both ends

Minimum Height – Second Option

Ends of film join at connection points. Flats need to be provided in antenna ground plane structure to accommodate switching boards.

MULTIBEAM PLANAR ANTENNA STRUCTURE AND METHOD OF FABRICATION

RELATED APPLICATION

This application is the full utility filing of U.S. provisional application No. 60/447,527 filed on Feb. 14, 2003, from which the present application claims priority and which is incorporated herein by reference.

CROSS-REFERENCE TO RELATED APPLICATIONS

This Patent Application is related to the following Provisional patent applications filed in the U.S. Patent and Trademark Office, the disclosures of which are expressly incorporated herein by reference:

U.S. Patent Application Ser. No. 60/446,617 filed on Feb. 12, 2003 and entitled "System for Coordination of Multi Beam Transit Radio Links for a Distributed Wireless Access System" [15741]

U.S. Patent Application Ser. No. 60/446,618 filed on Feb. 12, 2003 and entitled "Rendezvous Coordination of Beamed Transit Radio Links for a Distributed Multi-Hop Wireless Access System" [15743]

U.S. Patent Application Ser. No. 60/446,619 filed on Feb. 12, 2003 and entitled "Distributed Multi-Beam Wireless System Capable of Node Discovery, Rediscovery and Interference Mitigation" [15742]

U.S. Patent Application Ser. No. 60/447,643 filed on Feb. 14, 2003 and entitled "An Omni-Directional Antenna" [15908]

U.S. Patent Application Ser. No. 60/447,644 filed on Feb. 14, 2003 and entitled "Antenna Diversity" [15913]

U.S. Patent Application Ser. No. 60/447,645 filed on Feb. 14, 2003 and entitled "Wireless Antennas, Networks, Methods, Software, and Services" [15912]

U.S. Patent Application Ser. No. 60/447,646 filed on Feb. 14, 2003 and entitled "Wireless Communication" [15897]

U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]

U.S. Patent Application Ser. No. 60/453,011 filed on Mar. 7, 2003 and entitled "Method to Enhance Link Range in a Distributed Multi-hop Wireless Network using Self-Configurable Antenna" [15946]

U.S. Patent Application Ser. No. 60/453,840 filed on Mar. 11, 2003 and entitled "Operation and Control of a High Gain Phased Array Antenna in a Distributed Wireless Network" [15950]

U.S. Patent Application Ser. No. 60/454,715 filed on Mar. 15, 2003 and entitled "Directive Antenna System in a Distributed Wireless Network" [15952]

U.S. Patent Application Ser. No. 60/461,344 filed on Apr. 9, 2003 and entitled "Method of Assessing Indoor-Outdoor Location of Wireless Access Node" [15953]

U.S. Patent Application Ser. No. 60/461,579 filed on Apr. 9, 2003 and entitled "Minimisation of Radio Resource Usage in Multi-Hop Networks with Multiple Routings" [15930]

U.S. Patent Application Ser. No. 60/464,844 filed on Apr. 23, 2003 and entitled "Improving IP QoS though Host-Based Constrained Routing in Mobile Environments" [158071]

U.S. Patent Application Ser. No. 60/467,432 filed on May 2, 2003 and entitled "A Method for Path Discovery and Selection in Ad Hoc Wireless Networks" [15951]

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

U.S. Patent Application Ser. No. 60/480,599 filed on Jun. 20, 2003 and entitled "Channel Selection" [16146]

FIELD OF THE INVENTION

The invention relates generally to microwave planar or "flat plate" multibeam antenna structures and fabrication processes, and more particularly to the provision of such a simplified, cost-effective structure and process.

BACKGROUND TO THE INVENTION

Within a wireless communication network, such as a distributed wireless communication network involving a combination of access radio links and transit radio links, it may be desirable to provide for both directional transmission, from a first node to a second node (i.e., "point-to-point"), and broadcast transmission, from a first node to any receiving equipment within the coverage area. Such "broadcast" transmission may be in the form of an omni-directional transmission, such as one covering a 360 degree field of coverage, or a somewhat lesser field of coverage that is nevertheless broader than is the case of a single directional transmission. Various antenna arrangements, such as "flat plate" antenna structures, have been proposed to address the needs for directional and broadcast transmissions. However, many of these proposals have been encumbered with the disadvantage of undue complexity, arising in part from their reliance on sophisticated, and therefore costly, multilayer designs requiring conductor leads to traverse paths through the antenna substrate parallel as well as perpendicular to the plane of the substrate.

SUMMARY OF THE INVENTION

According to a first aspect of the invention there is provided a multiple beam antenna, comprising:
a flexible substrate having a conductive layer;
a plurality of directional antennas formed in the conductive layer; and
a plurality of electrical connections formed in the conductive layer connecting each of said plurality of directional antennas to at least one predetermined area of said substrate.

The flexible substrate may be shaped so that said plurality of directional antennas point in prescribed directions.

This provides a low cost, high functionality multiple beam antenna. The multiple beam antenna can be shaped such that the directional antennas cover a full 360° or alternatively cover any other range of angles, (e.g. 270° or 180°).

The plurality of directional antennas and the plurality of electrical connection may be formed in the conductive layer in a single fabrication step.

The flexible substrate may comprise a single conductive layer.

By integrating the antennas and electrical connections into a single layer, this reduces the part count which reduces the complexity and cost of fabricating the multiple beam antenna.

The multiple beam antenna may further comprise a beamformer.

The beamformer may be formed in said conductive layer.

Advantageously, this further reduces part count.

Each of said plurality of directional antennas may comprise an antenna element.

Each of said plurality of directional antennas may comprise a plurality of antenna elements.

The plurality of antenna elements may be arranged to provide dual polarisations.

The plurality of antenna elements may be arranged in an array. The array may be a one dimensional array (a row or a column) or a two dimensional array.

The multiple beam antenna may further comprise switch circuitry.

The multiple beam antenna may further comprise a plurality of overlay couplers.

Advantageously, this eliminates any right angle transitions within the signal path which reduces the complexity, cost and losses of the device.

The overlay couplers may connect said electrical connections to said switch circuitry.

The switch circuitry may be formed in said conductive layer.

Advantageously, this reduces part count.

The electrical connections may connect each of said plurality of directional antennas to said switch circuitry.

The electrical connections may be microstrip lines.

The flexible substrate may be conformed in close proximity to a back plane.

The electrical connections may extend generally in one direction towards one area of said substrate.

Some of said electrical connections may extend generally toward a first side of said substrate to a first predetermined area, and other of said electrical connections may extend generally toward a second, opposite side of said substrate to a second predetermined area.

At least some of the antenna elements may be provided as microstrip antenna elements.

At least some of the antenna elements may be provided as probe fed aperture elements.

The switch circuitry and directional antennas may be arranged on a common side of said substrate.

The substrate may be arranged in a substantially 3-dimensional configuration to position the one dimensional arrays of antenna elements in columns, and wherein at least two adjacent columns are not coplanar.

The multiple beam antenna may further comprise a ground plane; and a dielectric interposed between at least a portion of said substrate and said ground plane.

The flexible substrate may further comprise a second conductive layer; and the multiple beam antenna may further comprise:
a second plurality of directional antennas formed in said second conductive layer; and
a second plurality of electrical connections formed in said second conductive layer connecting each of said second plurality of directional antennas to at least one predetermined area of said substrate.

The plurality of directional antennas may be substantially aligned with said second plurality of directional antennas.

The plurality of directional antennas may be arranged to provide beams of a first polarisation and said second plurality of directional antennas may be arranged to provide beams of a second polarisation.

The plurality of directional antennas may be arranged to operate at a first range of frequencies and said second plurality of directional antennas may be arranged to operate at a second range of frequencies.

The multiple beam antenna may have a substantially hexagonal cross-section. It may alternatively have a substantially conical shape.

According to a second aspect of the invention there is provided an antenna module comprising a multiple beam antenna as described above.

The antenna module may further comprise: a ground plane; electronics; a dielectric layer between said flexible substrate and said ground plane; and an outer protective housing.

The antenna module may further comprise: control software.

The flexible substrate may be wrapped around said ground plane.

According to a third aspect of the invention there is provided a communications network comprising a plurality of multiple beam antennas as described above.

According to a fourth aspect of the invention there is provided a communications network comprising a plurality of antenna modules as described above.

According to a fifth aspect of the invention there is provided a method of fabricating a multiple beam antenna comprising the steps of:
forming a plurality of directional antennas in a conductive layer of a flexible substrate; and
forming a plurality of electrical connections in said conductive layer connecting each of said plurality of directional antennas to at least one predetermined area of said substrate.

The method may further comprise the step of: shaping said flexible substrate such that said plurality of directional antennas point in prescribed directions.

Advantageously, this provides a simple and low cost route to fabricate a multiple beam antenna.

The method may further comprise the step of shaping said flexible substrate such that it fits against an object.

Advantageously, this provides flexibility in the shape and location of the multiple beam antenna and may result in efficient use of space.

The object may comprise a housing. The object may also be an element to which the multiple beam antenna may be mounted, for example a pole or sign.

The method may further comprise the step of mounting control electronics within said housing.

Advantageously this enables fabrication of a compact multiple beam antenna.

The method may further comprise the step of forming a beamformer in said conductive layer.

The method may further comprise the step of connecting said flexible substrate to a second substrate with a plurality of overlay couplers.

The method may further comprise the step of integrating switching circuitry into said flexible substrate.

Advantageously, the integration of additional functionality into the flexible substrate reduces the part count and simplifies the fabrication process. This may provide benefits in cost, manufacturing time and reliability.

The preferred features may be combined as appropriate, as would be apparent to a skilled person, and may be combined with any of the aspects of the invention.

BRIEF DESCRIPTION OF THE DRAWINGS

An embodiment of the invention will now be described with reference to the accompanying drawings in which:

FIG. 1A is a schematic diagram of the substrate for a hexagonal antenna;

FIG. 1B is a top sectional view of an antenna structure formed from the substrate of FIG. 1A;

FIG. 3A is a plan view of an octagonal antenna structure illustrating details of an associated support structure;

FIG. 3B is an expanded view of a section of FIG. 3A;

FIG. 4A is a sectional side view of a portion of an antenna;

FIGS. 5A and 5B are top sectional and side elevational views, respectively, of antennas constructed in accordance with the invention;

FIGS. 6A and 6B are schematic illustrations of circuit layouts for different polarization arrangements for antennas in accordance with alternative aspects of the invention;

DETAILED DESCRIPTION OF INVENTION

Embodiments of the present invention are described below by way of example only. These examples represent the best ways of implementing the invention that are currently known to the Applicant although they may not be the only ways in which the invention can be implemented.

Figure 1C:
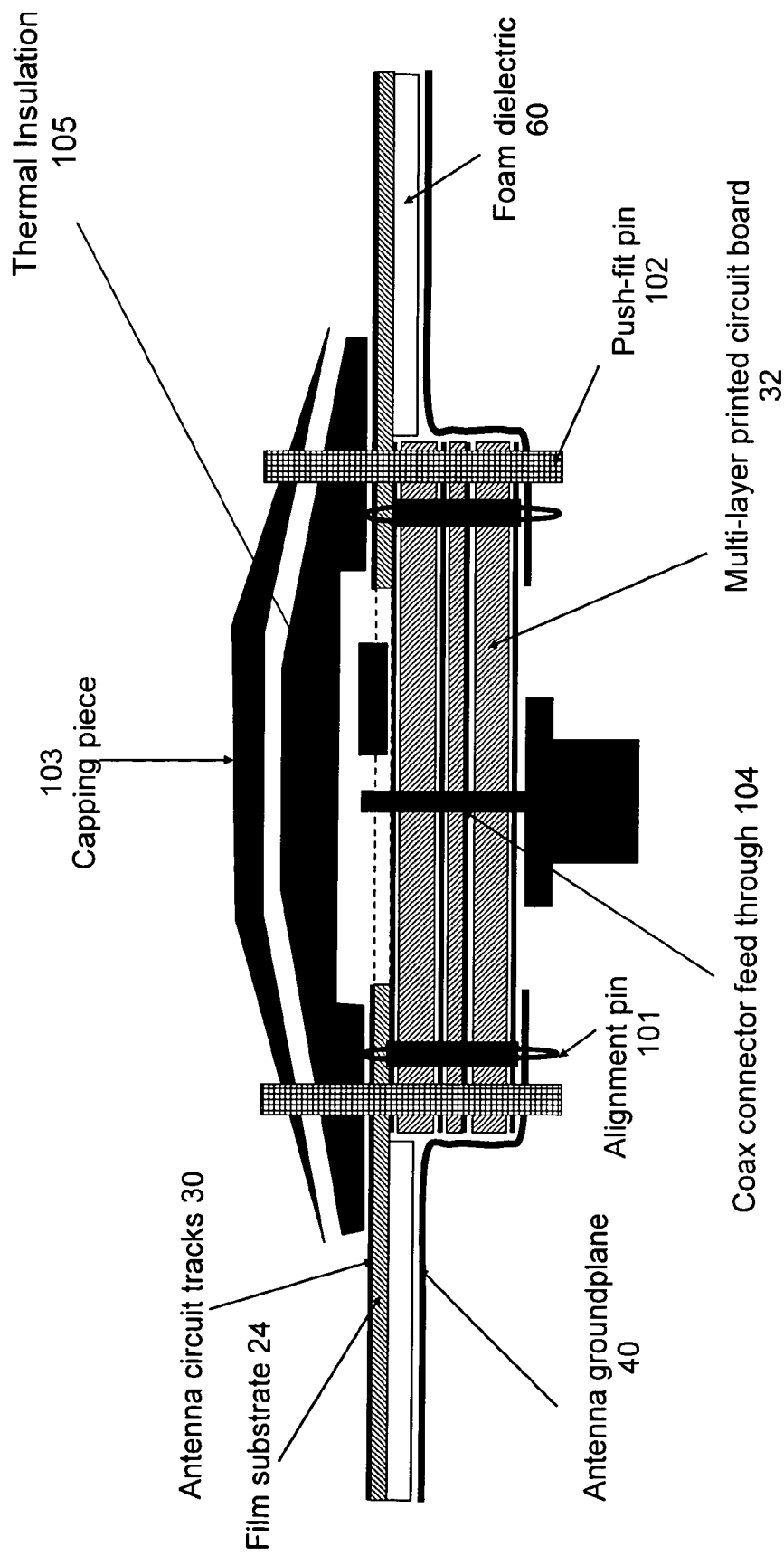
FIG. 1C is an enlarged view of a section of FIG. 1B.

With reference to FIGS. 1A-1C, a multiple beam antenna in accordance with one preferred aspect of the invention, designated generally by reference character 20, is described. The antenna 20 is comprised of a plurality of panel sections 22 formed in a thin film flexible (or deformable) substrate 24. The substrate 24 can be formed from a suitable dielectric material, such as a polyamide (such as Kapton®) or a polyester (for example, Mylar®) film of the order of from about 0.1 mm to about 0.5 mm in thickness. Other suitable dielectric materials can be used for the substrate 24 as will be evident to persons skilled in the antenna art. The panel sections 22 are separated from one another by the illustrated divider lines 26, although such lines 26 are provided for illustration purposes only to facilitate depiction of discrete antenna segments. While six panel sections 22 are depicted, corresponding to a panel antenna having a hexagonal configuration, as depicted in FIG. 1B, a greater or lesser number of panel sections 22 can be provided, in accordance with the desired number of antenna directional orientations. The lines 27 (shown as dotted lines) are for illustration purposes only and indicate the position of the bend (or corner) when the substrate is formed into the required shape. The length L between depicted lines 26 and 27 represents the length of substrate 24 required between the sections 22 to position the sections 22 in a desired angular orientation, such as the hexagonal array depicted in FIG. 1B.

The antenna shown in FIGS. 1A-1C has regularly spaced antenna elements and flat panels. This is shown by way of example only, and the antenna elements may be irregularly spaced and the antenna may be formed in any shape, for example, circular, substantially square or conical (the panels 22 may be arranged such that they are not co-planar and/or not parallel).

The spacing of the antenna elements is described in more detail in co-pending U.S. provisional patent application No. 60/451,897 filed Mar. 4, 2003.

Each panel section 22 includes a directional antenna shown in FIG. 1A as an array of antenna elements 28, which can be in the form of conductive patches, microstrip elements or probe fed aperture elements that are arranged in columns connected by conductors (or electrical connections) 30 to a circuit board (or transition board) 32. The conductors (or feed lines) 30 are arranged with feed lines that are routed above and/or below the antenna element array. The conductors can optionally be configured as microstrip lines having a nominal width of about 1 mm to about 3 mm, although different widths can be provided in accordance with the patterning technique employed. The foregoing conductor routing schemes avoid the need for passing the conductors transversely into the substrate for routing to the circuit board. This serves to minimize substrate thickness and eliminates stresses that would otherwise be associated with the conductors as a consequence of their traversal of angular paths, all of which can compromise antenna reliability and performance. Simple selection switching can be employed to energize the respective columns of antenna elements. While a total of four antenna elements per panel section 22 are depicted, it is to be appreciated that a greater or lesser number of antenna elements can be provided in accordance with the teachings of the invention and the demands of the application (elevation beam width, gain, etc.) with which the antenna is to be used.

The directional antennas shown in FIG. 1A comprise a column of antenna elements. However, the directional antennas may have a different structure, for example they may comprise only one antenna element, or they may comprise a row of elements in a horizontal plane. Alternatively the directional antennas may comprise a two-dimensional array of antenna elements (e.g. 2×2 arrangement).

In the antenna arrangement (or antenna module) depicted in FIG. 1B, the antenna 20 is formed around a metal back plane 40 that positions the antenna elements 28 in a prescribed (or predetermined) orientation, as will be described in greater detail below. The antenna 20 is maintained in proper orientation by suitable infrastructure (not shown), including but not limited to poles, posts, walls, mounting brackets, trees and signs. The antenna is surrounded by a protective covering or radome 29 to protect the antenna from the elements. Preferably, the antenna is formed such that the patch array and associated conductors are formed in a single layer, as illustrated and as described later. The antenna formed in the single layer can be a single or dual polar design. The radome 29 may include an outer shield layer and a sun shield on top of the outer shield layer. Power and other connections to the antenna (e.g. Ethernet cables) may run up the center mounting tube S. These connections may connect to the circuit board 32, the internal electronics 23 or other components within the antenna 20. The arrangement of electronics and other internal components shown in FIG. 1B is by way of example only, and the antenna may in some implementations not include any internal components or electronics.

There are alternative methods of producing a dual polar design, including using a single layer substrate with metallization on both sides (one polarisation on each side) or multiple layers can be provided and aligned with one polarization radiating through the other. In such instances, the layers 24 can be mechanically fastened or adhesively bonded to maintain positional alignment and structural integrity. Multiple layers may also be used for multiple band antennas, where each layer contains directional antennas for different bands of frequencies.

The circuit (or transition) board 32 is shown in FIGS. 1A-D as a discrete element, however it may alternatively be integrated into the substrate, for example by being bonded as a laminate. The circuit board may be a single layer, double sided or multilayer circuit board. The circuit board may include different functionality, including but not limited to switching and/or beamforming. The switching functionality may switch parameters including but not limited to beam, polarisation and frequency band.

Example material details, (including dimensions by way of example only), for the antenna shown in FIG. 1B are listed below in order from inside to outside:

Steel or Aluminium ground with 5 mm by 33 mm patch recesses and air release pinholes.

Air in patch recesses or if required polyethelene foam.

1 or 1.5 mm closed cell polyethelene foam. This may have 5 μm low loss glue slow tack coatings on both sides or may be without glue and clamped in place.

Mylar 0.004" with 0.0012" copper on outside.

2 mm Air Gap (alternatively this could be filled, for example with foam as above).

3 mm outer housing (2 mm would flex significantly in the wind) uPVC.

Figure 1D:
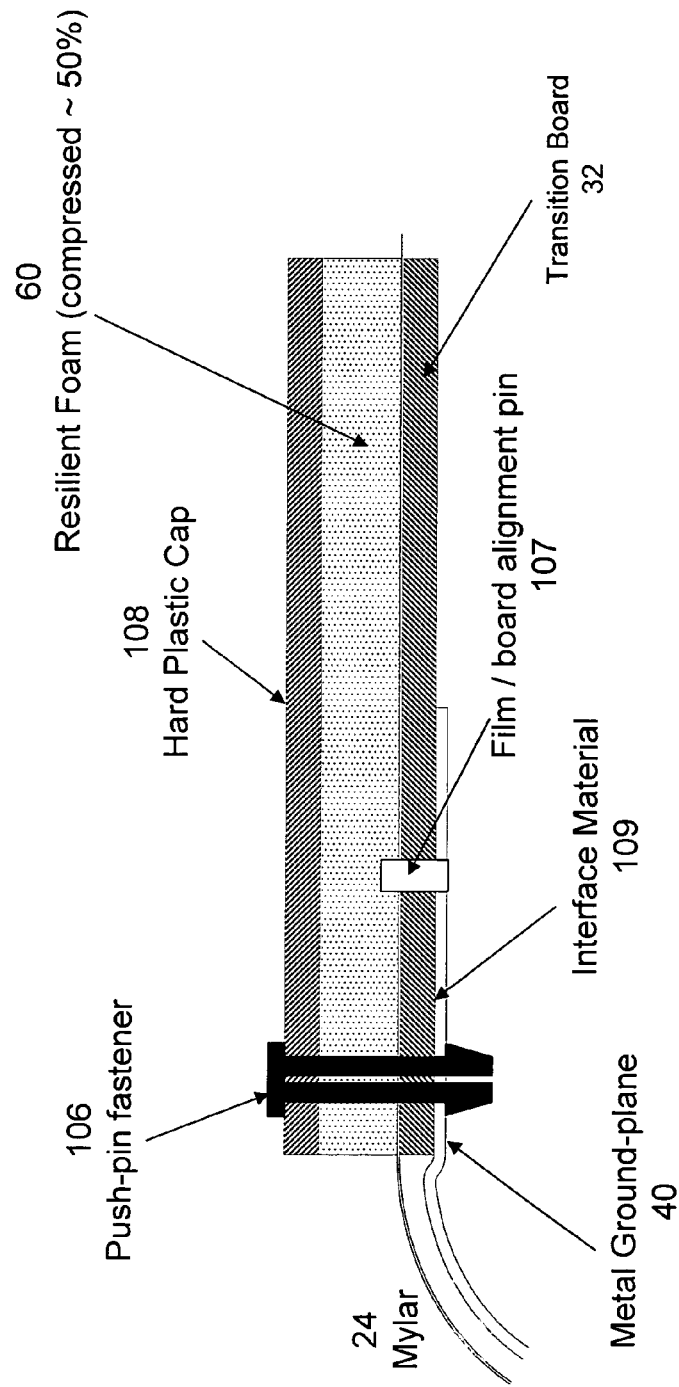
FIG. 1D shows an alternative arrangement for aligning and fixing the circuit board to that shown in FIG. 1C.

FIG. 1C shows an enlarged section of FIG. 1B and shows the arrangement for aligning and fixing the circuit board 32 to the substrate 24. Alignment pins 101 are used to align the circuit board 32 to the substrate 24. These pins may be discrete items (as shown in FIG. 1C) or alternatively the may be integral to one of the other component parts, for example the capping piece 103. Ground connections between the piece parts are provided by push-fit pins 102 pressed onto vias on the circuit board and attached to the ground plane or back plane 40. The push-fit pins may be discrete items (as shown in FIG. 1C) or alternatively they may be integral to one of the other component parts, for example the ground plane 40. A capping piece 103 serves to protect and strengthen the structure. An alternative arrangement is shown in FIG. 1D. This shows a push-pin fastener 106 which holds the substrate 24 and board 32 together. The two are aligned by a separate alignment pin 107. A plastic cap 108 provides for protection and stabilisation of the join and the connection between the ground plane and the transition board is achieved by an interface material 109 which is conductive. Connections may be made to the circuit (or transition) board via a coaxial connector 104. Thermal insulation 105 may optionally be provided between the capping piece 103 and the circuit board.

Figure 2:
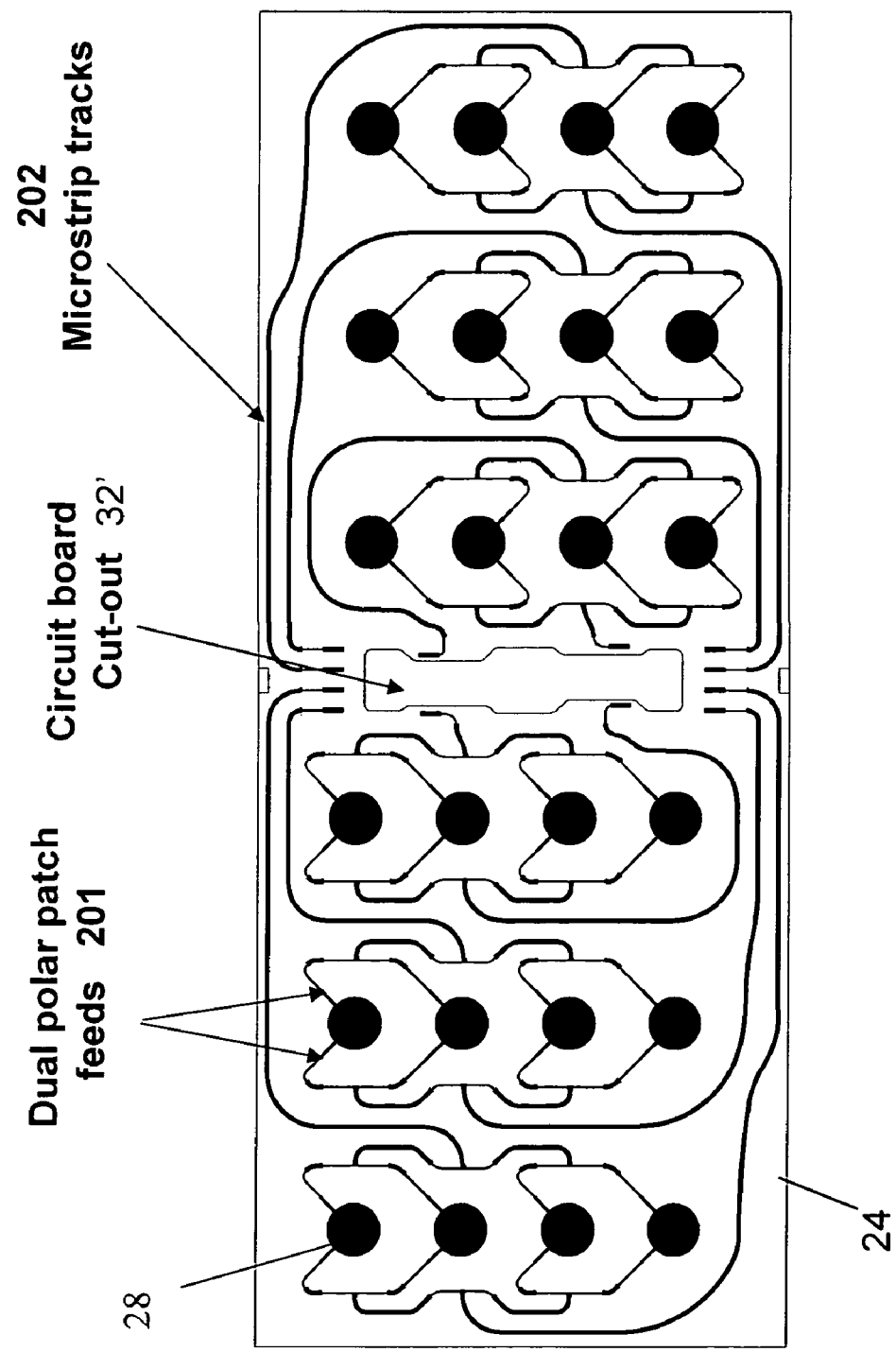
FIG. 2 is a schematic diagram of the substrate for a hexagonal antenna antenna.

FIG. 2 shows another aspect of the present invention and depicts the flexible substrate 24 (or film) unwrapped to show the antenna patches 28 and tracks 202. The design shown in FIG. 2 provides that the circular patch can be fed in two polarisations. This requires that the feed of one polarisation does not unduly compromise the performance of the other polarisation.

FIG. 2 shows an antenna that is formed from four antenna elements 28 per panel section. The antenna elements 28 are arranged as dual polar patches (using dual polar feeds 201) so as to generate a multibeam array having a mutually orthogonal polarization, such as −45 degrees and +45 degrees, respectively. The dual polarization inputs are delivered to the patches through the circuit board which is placed in a cut-out 32' in the substrate in a manner well known in the art.

Figure 3C:
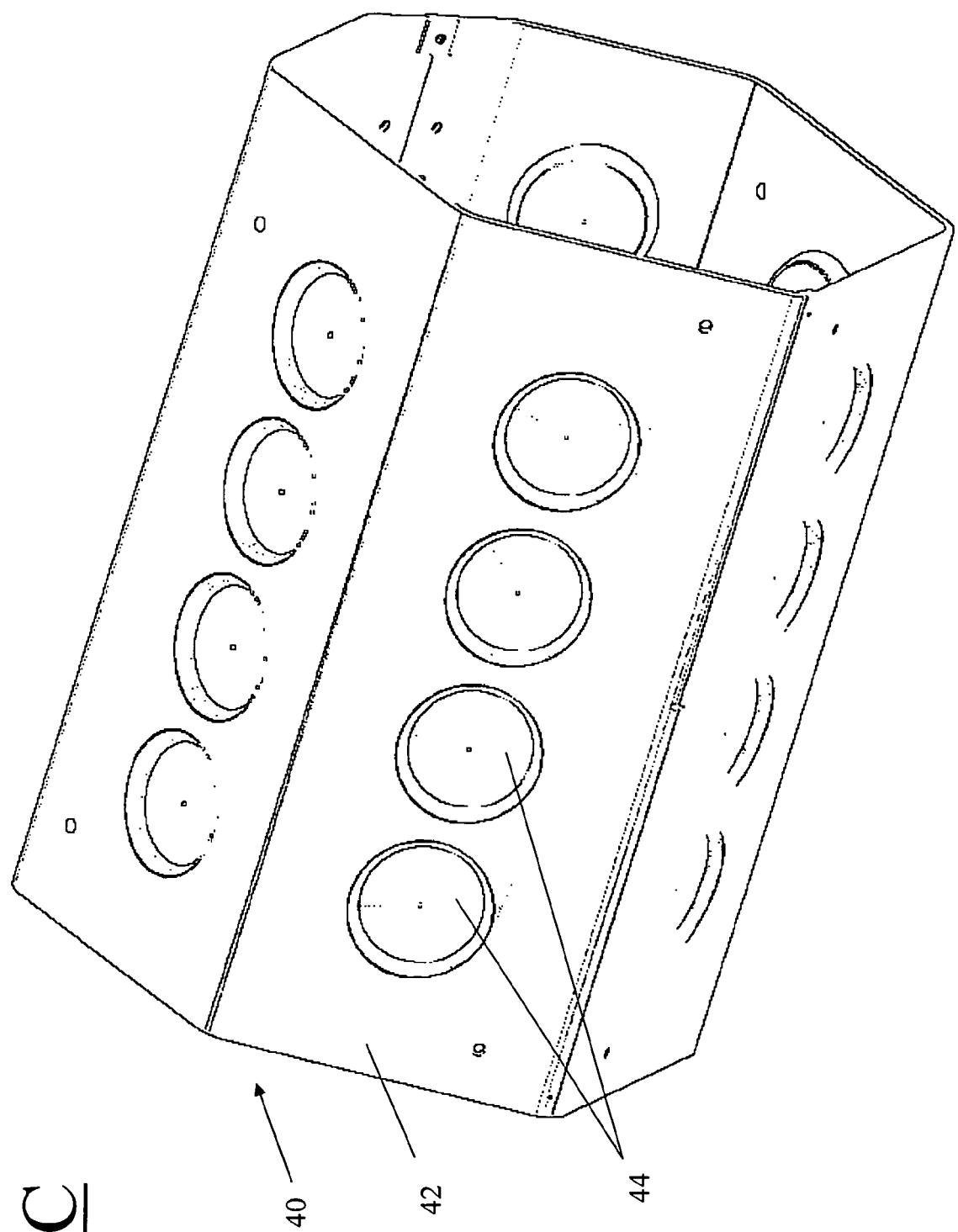
FIG. 3C is a three dimensional view of the back plane of a hexagonal antenna structure as shown in FIG. 1B.

FIGS. 3A and 3B illustrate further aspects of the invention, comprising an eight panel array that is depicted around back plane 40 arranged to provide an octagonal array of antennas. The back plane 40 is typically formed of a suitable metal, such as aluminium, that is inexpensive and capable of being formed into a suitable shape. The back plane 40 is formed of a stamped panel (as shown in FIG. 3C) that is provided with a plurality of recesses 44 dimensioned and configured to receive corresponding antenna elements 28. The antenna 20 is arranged in close proximity to the back plane 40 such that the antenna elements 28 are arranged in close proximity to the recesses 44. Suitable bonding or coupling media can optionally be provided to maintain the position of the antenna in the desired orientation and proximity to the back plane 40. Foam or other suitable insulative/dielectric layers 60, 62 can optionally be provided to maintain the spatial alignment and separation of the substrate 24 (and particularly the conductors 30 carried thereby) relative to the back plane 40. Insulative/dielectric layer 60 optimally formed with a thickness of about 1 mm, whereas optional insulative/dielectric layer 62 can be thicker in accordance with the depth of the recesses 44 and the physical characteristics of the substrate 24.

The back plane may act as a ground plane or a separate ground plane may be provided. A three-dimensional view of a back plane 40 of a six panel antenna (as shown in FIG. 1B) is shown in FIG. 3C. The back plane takes the form of stamped panel 42. While annular recesses 44 are depicted, other configurations can be provided so as to complement the shape of the antenna elements 28.

The back plane has additional benefits in that it provides a rigid mechanical structure in which the internal electronics may be housed. The ground plane of the back plate may also be designed so as to provide EMI (Electro-Magnetic Interference) shielding for the internal electronics, reducing spurious external radiation from the unit. The wrap-around ground plane design of the antenna structure also enables electromagnetic coupling between the internal electronics and the antenna to be minimised.

The back plane is shown having rounded corners, (for example having a 10 mm bend radii). This is to avoid radiation from the corners and to improve film positioning.

Figure 4B:
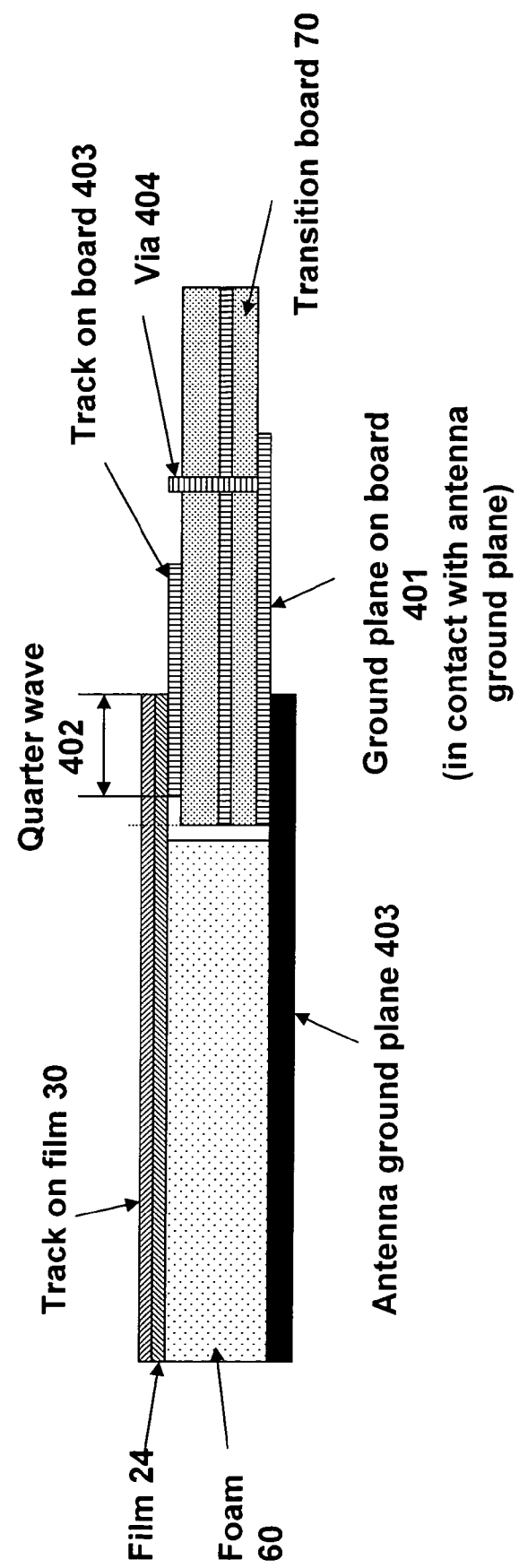
FIG. 4B is a sectional side view of an alternative connection to that shown in FIG. 4A.
Figure 7:
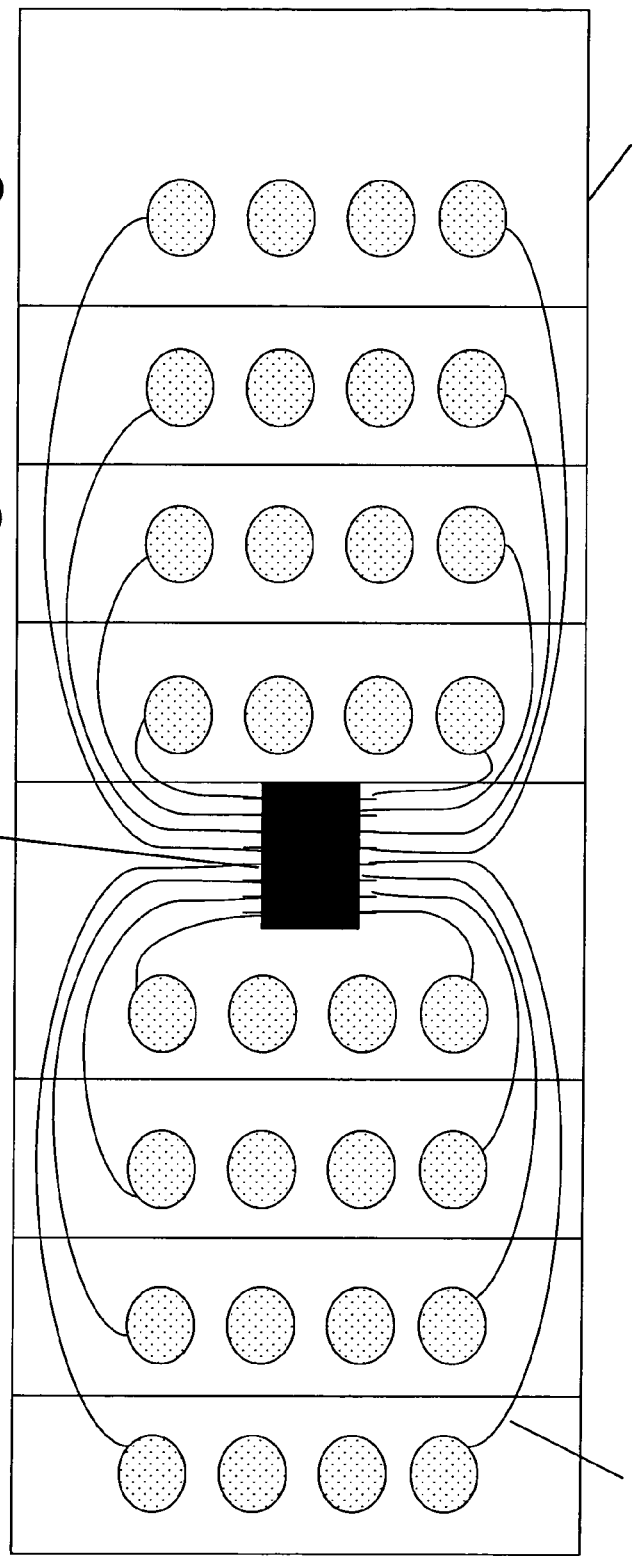
FIGS. 7-11 are schematic illustrations of alternative track layout arrangements.
Figure 8:
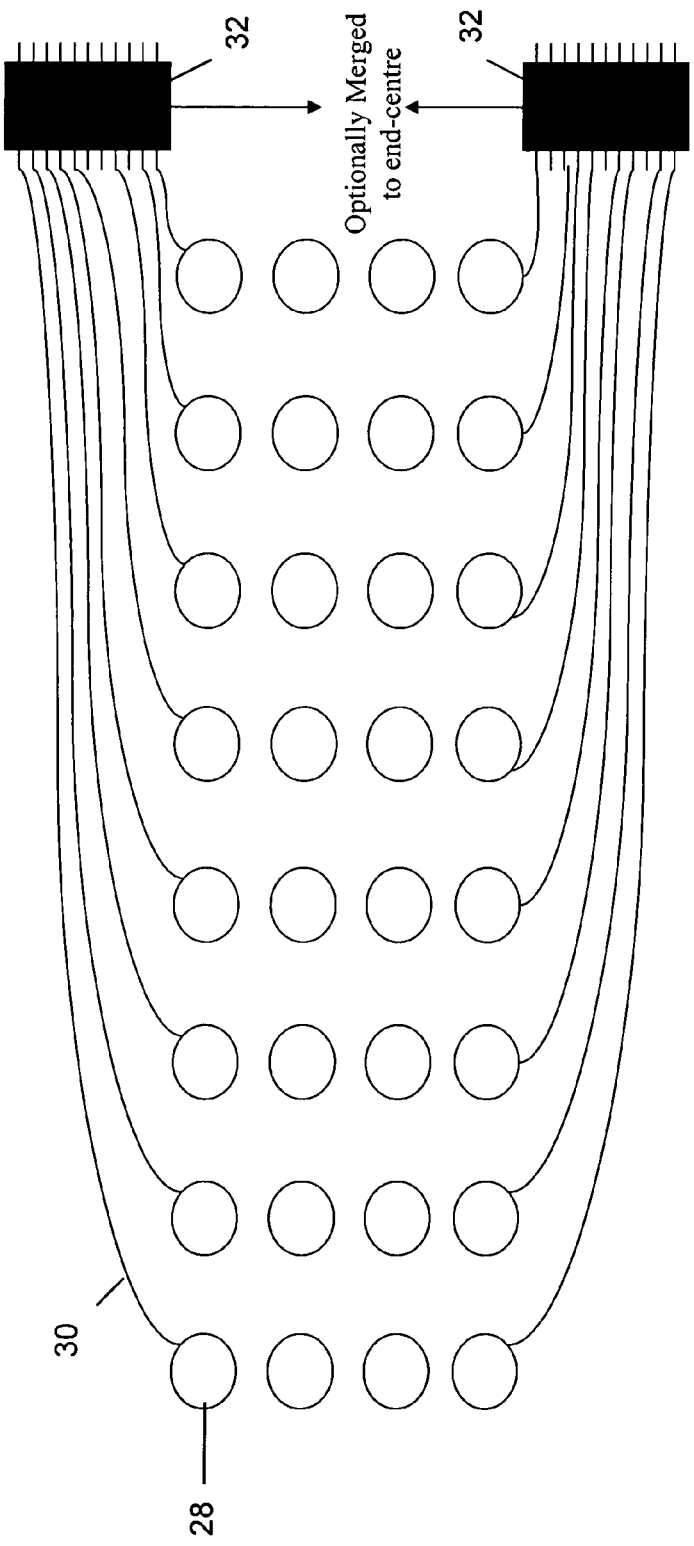
Figure 9:
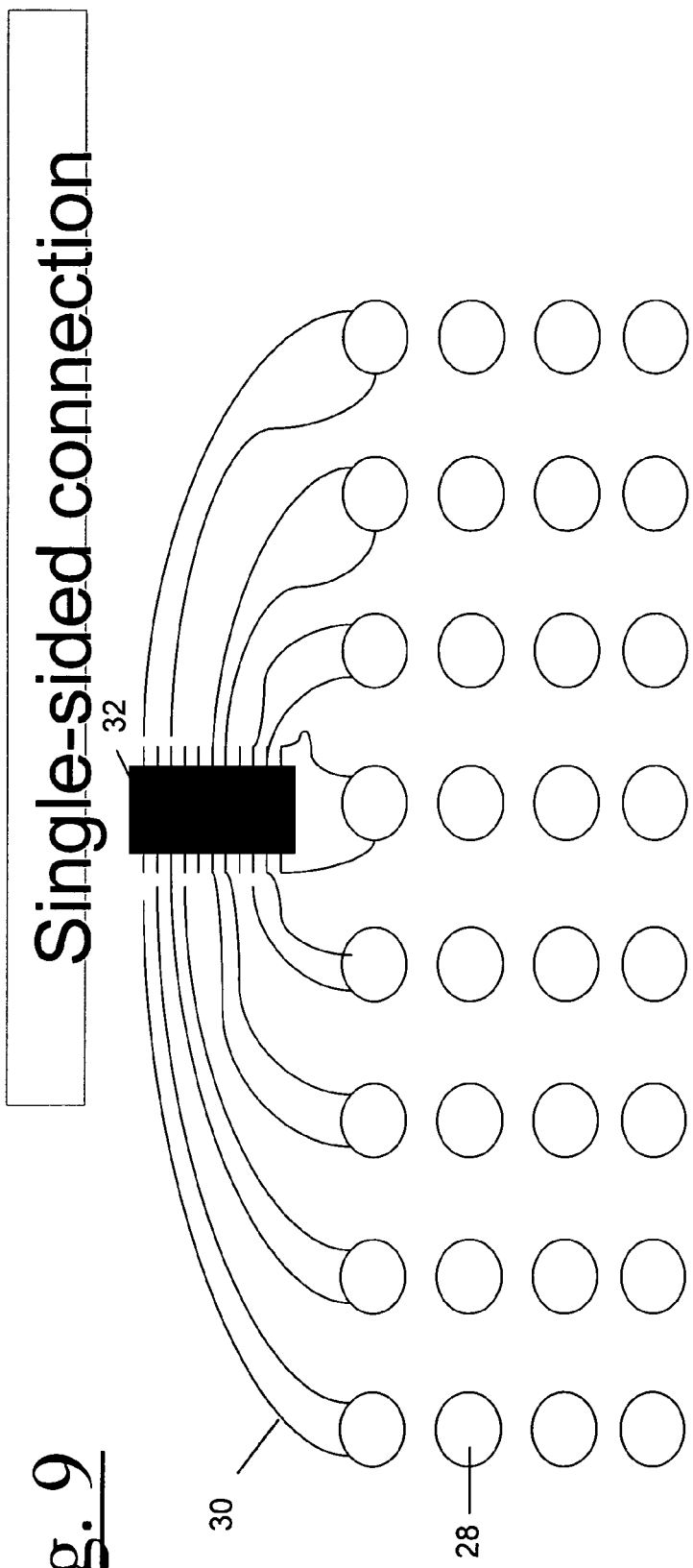

FIG. 4A depicts coupling of the antenna substrate 24 to the circuit board (70, generally) and associated circuitry (80, generally). This board may be a switch board or a beamformer and the circuitry may be for switching or beamforming, as described earlier. Suitable bonding or coupling media 402 (adhesive, clamps, fasteners (threaded and otherwise)) may be employed to secure the substrate to the circuit board 70 and the back plane 40. Insulative/dielectric film 60 can be provided to maintain support for the substrate 24, particularly in the vicinity of the circuit board 70 and associated circuitry (e.g. switchgear) 80, and electrical isolation of the conductors 30 from the back plane 40, as discussed previously. The connection of the antenna substrate to the switch board may be achieved by means such as overlay couplers or probes into waveguides. Preferably the connection is achieved without the need for the signals to pass through right angle transitions or through solder joints. In FIG. 4A, the board is shown as having a different thickness to the foam. An alternative configuration for this connection is shown in FIG. 4B, where the foam 60 and the board 70 are substantially the same thickness. FIG. 4A shows a double-sided board, whereas FIG. 4B shows a multilayer board.

This is by way of illustration only and the board can have any appropriate construction. The board 70 may have a ground plane 401 which may connect to, or be in contact with, the antenna ground plane 403, which itself may be the back plane 40 or a separate item. The board may further comprise tracks 403 and vias 404 as is well-known in the art. FIG. 4B shows an overlap of a quarter wave of the track on the film over the track on the board. Alternative overlaps may also be used.

FIGS. 4A and 4B show non contact methods of coupling between the track on the film and the track on the board. Non contact methods have benefits in reliability, although contact methods could alternatively be used.

FIGS. 5A and 5B depict selective structural aspects of an octagonal antenna array. Different patch arrays are described to provide for desired azimuth beamwidth orientations. Electronics 301 may be housed inside the antenna structure, (as also shown in FIG. 3A and FIG. 1B, internal electronics 23), and as shown the panels of the antenna structure need not be equal in size. This may be to accommodate the circuit board 32. The antenna structure may be mounted via a mounting bracket 501 at the center of the structure. Alternatively, the antenna could be wrapped around a structure such as a pole, lamp post or tree. The antenna elements 28 shown may have a 60° azimuth beamwidth and it may be beneficial to use two (as shown) in a vertical array for 30° elevation beamwidth, or 3 or 4 for 20° or 15° beamwidth respectively.

Additional antennas 502, 503 may be mounted onto the antenna structure, for example, a vertical polarisation PIFA antenna 502 and a horizontal polarisation PIFA antenna 503, which can be used to provide additional or alternative omni-directional coverage., e.g. for an access link.

FIGS. 6A and 6B depict different arrangements for running conductor/feed lines 30 to the antenna elements 28 (the antenna patch distribution circuit). In FIG. 6A, the conductors 30 extend from opposite sides of the substrate 24 (not shown) to the antenna elements 28 to permit closer positioning of columns of antenna elements than is possible in other conductor arrangements, such as the arrangement depicted in FIG. 6B. As is evident from the foregoing, different conductor arrangements can be implemented without deviating from the teachings of the present invention. As described above, the directional antennas need not comprise of columns of antenna elements. They could comprise other structures including rows of elements (in a horizontal plane), two dimensional arrays or single elements.

Figure 10:
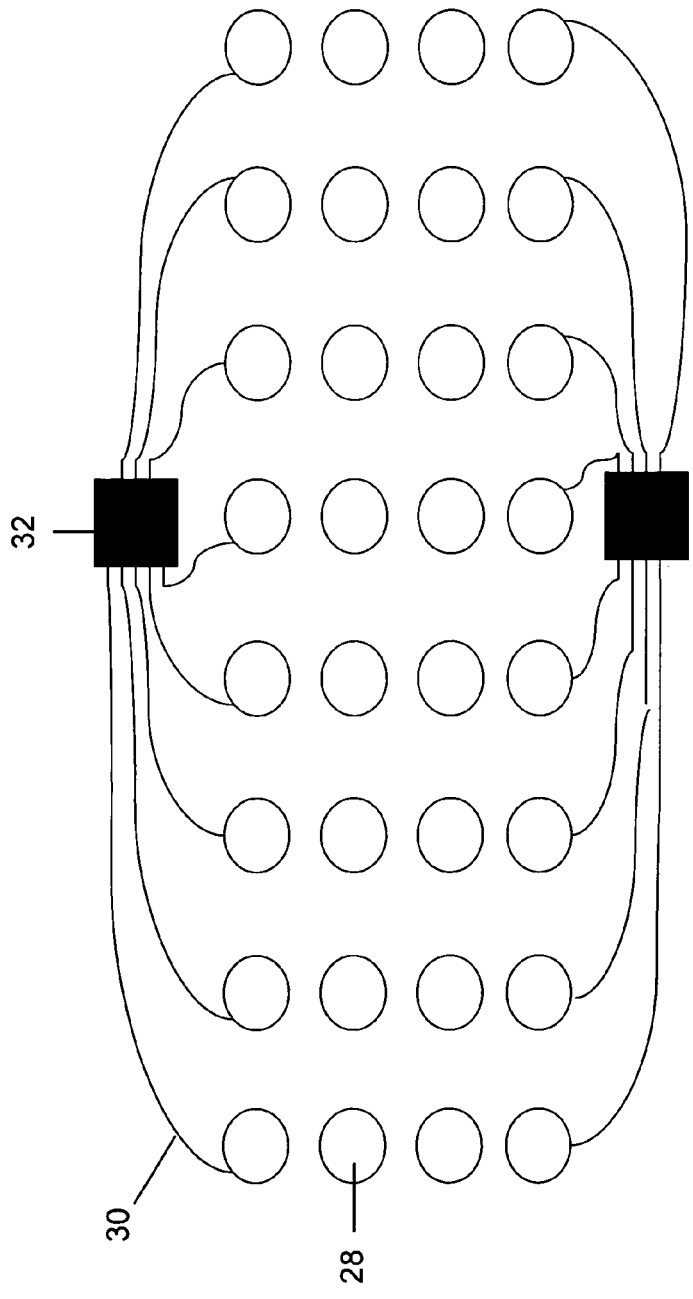
Figure 11:
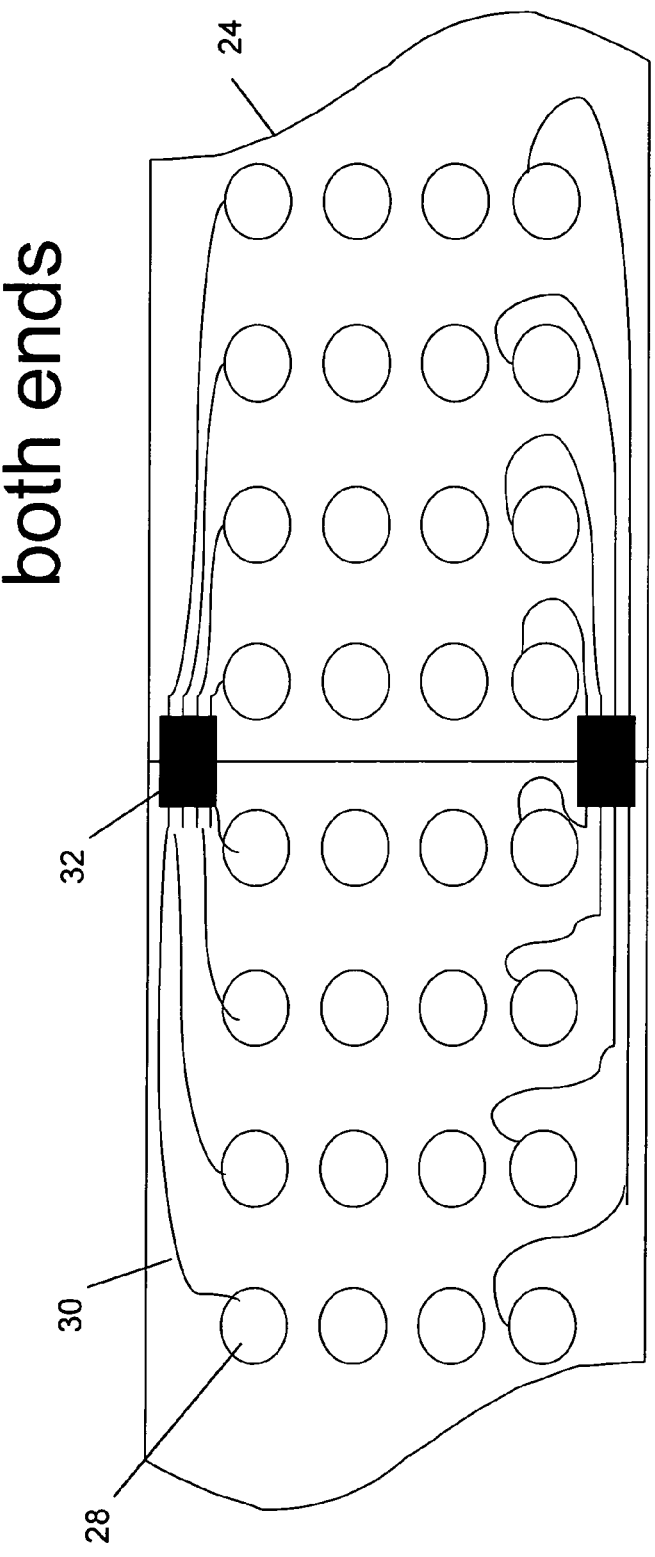

FIGS. 7-11 illustrate further antenna element 28, conductor 30 and circuit board 32 configurations. These figures are schematic illustrations only and do not show the connections within the columns of antenna elements. The arrangement depicted in FIG. 7 (which is similar to that of FIG. 6A), has the circuit board 32 positioned adjacent to one panel section, thus minimizing the overall height of the resulting antenna (at the "expense" of additional circumference of the resulting antenna structure). In contrast, the arrangement depicted in FIG. 8 reduces antenna structure circumference by positioning the circuit board 32 adjacent to an end of the substrate, thereby providing for enhanced isolation of the circuitry on the board 32 form the antenna elements. A single sided connection of the type depicted in FIG. 6B is illustrated further in the embodiment of FIG. 9. This arrangement, while increasing overall antenna structure height, allows for a reduction in structure circumference by virtue of the leads and the circuit board being positioned along one side of the antenna substrate. FIGS. 10 and 11 illustrate arrangements including two circuit boards 32, the difference between the two drawings being the positioning of the boards. In FIG. 10 they are shown generally in-line with a columnar array of antenna elements as opposed to straddling two such columnar arrays as in FIG. 11. As can readily be appreciated by persons of skill in the art, the configuration of FIG. 10 serves to minimize circumference, at the expense of greater height, whereas the arrangement depicted in FIG. 11 is to the contrary.

The multiple beam antenna may have individually controlled downtilt on each of the beams. The individually controlled downtilt may be fixed in value, for example by the shape of the antenna, e.g. the substrate may be formed around a conical structure, such as might be mounted on the ceiling of a room. In such an arrangement, the columns of elements will be neither parallel nor coplanar. The value of the individually controlled downtilt may alternatively be fixed electrically. It is also possible to have individually controlled variable downtilt on each of the beams of the antenna. This variation of the individually controlled downtilt may be achieved electrically either through variable electronic control or by mechanically changing the electrical properties of the circuit. One such method of varying the downtilt is by sliding a dielectric layer over the antenna circuitry.

Although the drawings show structures with 6 or 8 panels, the structure may have more or less panels. For example a structure having two panels may be formed around (or inside) a structure such as a sign to provide two directional beams in opposite directions. This may be applicable for coverage of a street or corridor.

Figure 12:
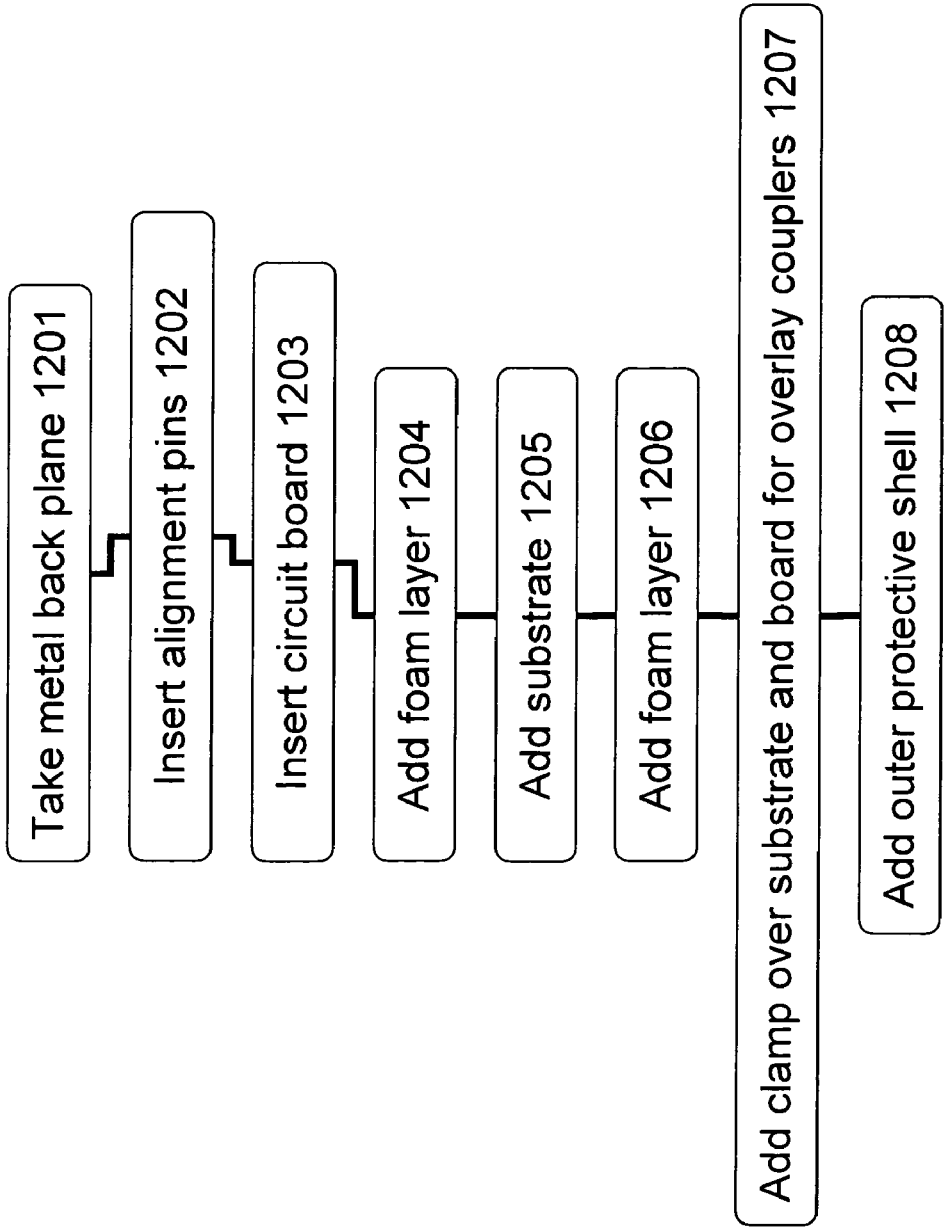
FIGS. 12 and 13 are flow diagrams of example methods of fabricating an antenna.

The multiple beams may provide coverage over a range of angles less than 360° (unlike the antenna shown in FIGS. 1A and 1B), FIG. 12 shows a flow chart of the fabrication process for such a multiple beam antenna:

Step 1201: Take metal backplane 40 (e.g. as shown in FIG. 3C). This may consist of more than one part that needs to be joined together, e.g. two halves of a shell.

Step 1202: Insert alignment pins (101; 107)

Step 1203: Insert circuit board 32, aligning with pins, for example as shown in FIG. 1C or 1D.

Step 1204: Add 1.5 mm foam layer

Step 1205: Add substrate 24

Step 1206: Add 2 mm foam layer

Step 1207: Add clamp over substrate and circuit board for overlay couplers, for example as shown in FIGS. 4A and 4B.

Step 1208: Add outer protective shell (or radome) 29. This may consist of multiple pieces, e.g. two halves of a shell and a sun cover on top.

Figure 13:
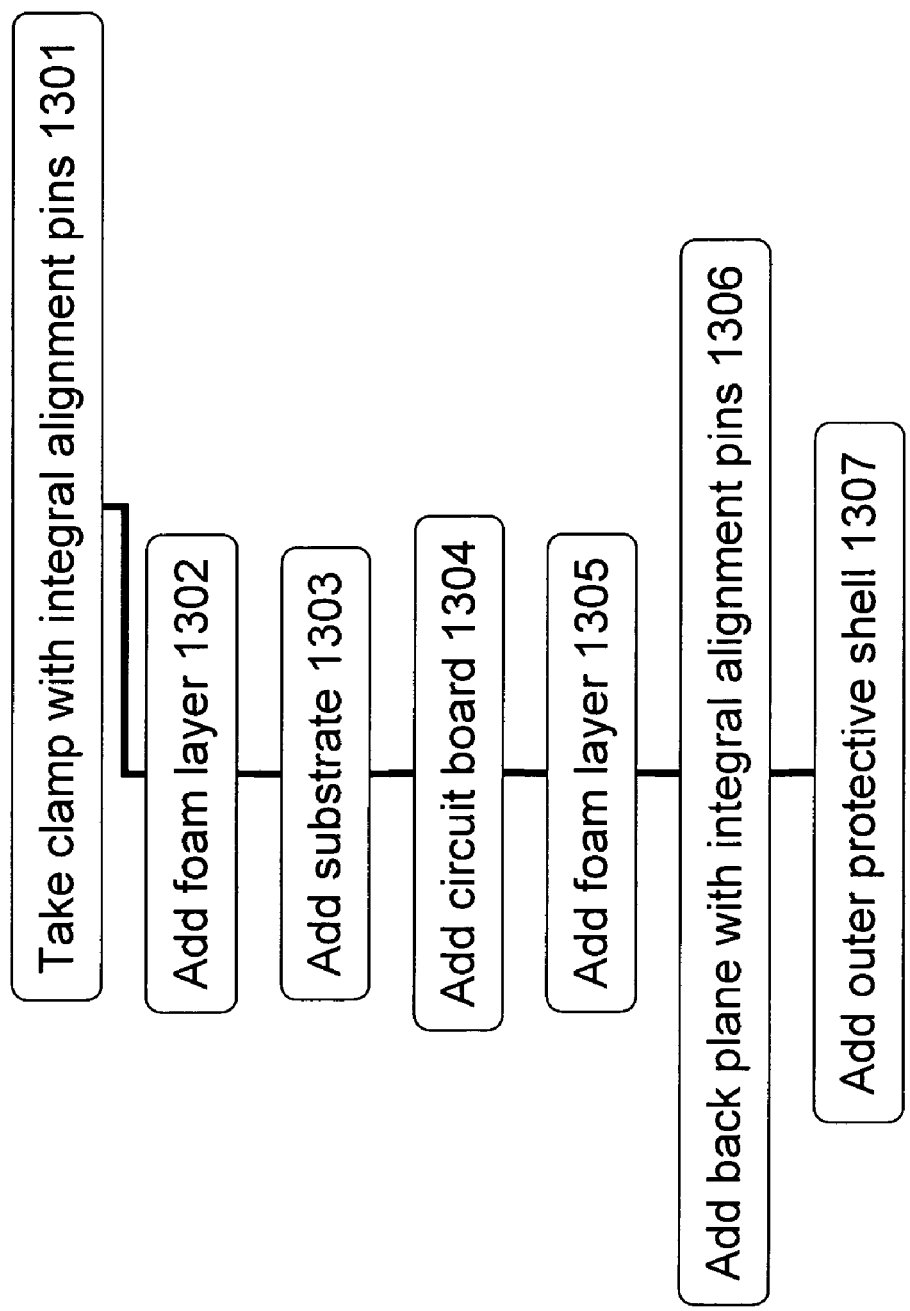

An alternative flow chart of the fabrication process is shown in FIG. 13:

Step 1301: Take clamp with integral alignment pins. This may be a modified version of the capping piece 103 as shown in FIG. 1C.

Step 1302: Add foam layer, aligning it with the aligning pins of the clamp.

Step 1303: Add substrate 24, aligning it with the aligning pins of the clamp.

Step 1304: Add circuit board 32, aligning it with the aligning pins of the clamp.

Step 1305: Add foam layer, aligning it with the aligning pins of the clamp.

Step 1306: Add back plane 40. The back plane may have integral alignment pins, and may consist of more than one piece.

Step 1307: Add outer protective shell 29. Again, this may comprise several pieces.

Steps 1301-1305 may be carried out with the foam layers and substrate laid flat. This requires that step 1306 also comprises wrapping the foam layers and substrate around the back plane and engaging the layers and substrate with any appropriate alignment pins integral to the back plane.

It will be understood that the above description of a preferred embodiment is given by way of example only and that various modifications may be made by those skilled in the art without departing from the spirit and scope of the invention.

The invention claimed is:

1. A multiple beam antenna, comprising: a flexible substrate having a conductive layer; a plurality of directional antennas formed in the conductive layer; and a plurality of electrical connections formed in the conductive layer connecting each of said plurality of directional antennas to at least one predetermined area of said substrate, wherein said flexible substrate is shaped so that said plurality of directional antennas point in prescribed directions and so that at least some directional antennas of said plurality of directional antennas are not coplanar, and each of said plurality of directional antennas comprising a plurality of antenna elements arranged to provide dual-polarisation beams, and said beam antenna further comprising a switch circuitry coupled in parallel to said electrical connections in the predetermined area of said substrate for selecting the dual-polarisation beams.

2. A multiple beam antenna as claimed in claim 1, wherein said plurality of directional antennas and said plurality of electrical connection are formed in the conductive layer in a single fabrication step.

3. A multiple beam antenna as claimed in claim 1, wherein said flexible substrate comprises a single conductive layer.

4. A multiple beam antenna as claimed in claim 1, further comprising:
a beamformer.

5. A multiple beam antenna as claimed in claim 4, wherein said beamformer is formed in said conductive layer.

6. A multiple beam antenna as claimed in claim 1, wherein the plurality of antenna elements are arranged in an array.

7. A multiple beam antenna as claimed in claim 6, wherein said array is a one-dimensional array.

8. A multiple beam antenna as claimed in claim 1, further comprising: a plurality of overlay couplers.

9. A multiple beam antenna as claimed in claim 8, wherein said overlay couplers connect said electrical connections to said switch circuitry.

10. A multiple beam antenna as claimed in claim 1, wherein said electrical connections connect each of said plurality of directional antennas to said switch circuitry.

11. A multiple beam antenna as claimed in claim 1, wherein the electrical connections are microstrip lines.

12. A multiple beam antenna as claimed in claim 1, wherein said flexible substrate is conformed in close proximity to a back plane.

13. A multiple beam antenna as claimed in claim 1, wherein said electrical connections extend generally in one direction towards one predetermined area of said substrate.

14. A multiple beam antenna as claimed in claim 1, wherein some of said electrical connections extend generally toward a first side of said substrate to a first predetermined area, and other of said electrical connections extend generally toward a second, opposite side of said substrate to a second predetermined area.

15. A multiple beam antenna as claimed in claim 1, wherein at least some of the antenna elements are provided as microstrip antenna elements.

16. A multiple beam antenna as claimed in claim 1, wherein at least some of the antenna elements are provided as probe fed aperture elements.

17. A multiple beam antenna as claimed in claim 1, wherein the switch circuitry and directional antennas are arranged on a common side of said substrate.

18. A multiple beam antenna as claimed in claim 7, wherein the substrate is arranged in a substantially 3-dimensional configuration to position the one dimensional arrays of antenna elements in columns, and wherein at least two adjacent columns are not coplanar.

19. A multiple beam antenna as claimed in claim 1, further comprising:
a ground plane; and a dielectric interposed between at least a portion of said substrate and said ground plane.

20. A multiple beam antenna as claimed in claim 1 wherein said flexible substrate further comprises a second conductive layer; said multiple beam antenna further comprising: a second plurality of directional antennas formed n said second conductive layer; and a second plurality of electrical connections formed in said second conductive layer, connecting each of said second plurality of directional antennas to at least one predetermined area of said substrate.

21. A multiple beam antenna as claimed in claim 20, wherein said plurality of directional antennas is substantially aligned with said second plurality of directional antennas.

22. A multiple beam antenna as claimed in any one or more of claims 20 and 21, wherein said plurality of directional antennas are arranged to provide beams of a first polarisation and said second plurality of directional antennas are arranged to provide beams of a second polarisation.

23. A multiple beam antenna as claimed in any one or more of claims 20 and 21, wherein said plurality of directional antennas are arranged to operate at a first range of frequencies and said second plurality of directional antennas are arranged to operate at a second range of frequencies.

24. A multiple beam antenna as claimed in claim 1 having a substantially hexagonal cross-section.

25. A multiple beam antenna as claimed in claim 1 having a substantially conical shape.

26. An antenna module comprising a multiple beam antenna as claimed in claim 1.

27. An antenna module as claimed in claim 26, further comprising: a ground plane; electronics; a dielectric layer between said flexible substrate and said ground plane; and an outer protective housing.

28. An antenna module as claimed in claim 27, further comprising:
control software.

29. An antenna module as claimed in claim 27, wherein said flexible substrate is wrapped around said ground plane.

30. A communications network comprising a plurality of multiple beam antennas as claimed in claim 1.

31. A communications network comprising a plurality of antenna modules as claimed in any one of claims 26-29.

32. A multiple beam antenna as claimed in claim 1, wherein said flexible substrate is conformed in close proximity to a back plane that has a plurality of recesses dimensioned and configured to receive said plurality of directional antennas.

33. A method of fabricating a multiple beam antenna comprising the steps of: forming a plurality of directional antennas in a conductive layer of a flexible substrate; forming a plurality of electrical connections in said conductive layer connecting each of said plurality of directional antennas to at least one predetermined area of said substrate, and shaping said flexible substrate such that said plurality of directional antennas point in prescribed directions and such that at least some directional antennas of said plurality of directional antennas are not coplanar, each of said plurality of directional antennae comprising a plurality of antenna elements arranged to provide dual-polarisation beams, and said beam antenna comprises a switch circuitry coupled in parallel to said electrical connections in the predetermined area of said substrate for selecting the dual-polarisation beams.

34. A method of fabricating a multiple beam antenna as claimed in claim 33, further comprising the step of: shaping said flexible substrate such that it fits against an object.

35. A method of fabricating a multiple beam antenna as claimed in claim 33, wherein said object comprises a housing.

36. A method of fabricating a multiple beam antenna as claimed in claim 35, further comprising the step of: mounting control electronics within said housing.

37. A method of fabricating a multiple beam antenna as claimed in claim 33, further comprising the step of: forming a beamformer in said conductive layer.

38. A method of fabricating a multiple beam antenna as claimed in claim 33, further comprising the step of: connecting said flexible substrate to a second substrate with a plurality of overlay couplers.

39. A method of fabricating a multiple beam antenna as claimed in claim 33, further comprising the step of: integrating switching circuitry into said flexible substrate.

40. A multiple beam antenna, comprising:

a flexible substrate having a conductive layer;

a plurality of directional antennas formed in the conductive layer; and a plurality of electrical connections formed in the conductive layer connecting each of said plurality of directional antennas to at least one predetermined area of said substrate, wherein each of said plurality of directional antennas comprises a plurality of antenna elements, wherein the plurality of antenna elements are arranged in an array, wherein said array is a one-dimensional array, wherein the substrate is arranged in a substantially 3-dimensional configuration to position the one dimensional arrays of antenna elements in columns and wherein said at least two adjacent columns are not coplanar, the plurality of antenna elements being arranged to provide dual-polarisation beams, and said beam antenna further comprising a switch circuitry coupled in parallel to said electrical connections in the predetermined area of said substrate for selecting the dual-polarisation beam.

* * * * *